A. CALLESON.
MACHINE FOR MAKING ARTICLES OF SHEET METAL.
APPLICATION FILED JAN. 25, 1915.

1,289,387.

Patented Dec. 31, 1918
9 SHEETS—SHEET 1.

WITNESSES

INVENTOR
Amos Calleson
per
ATTORNEY.

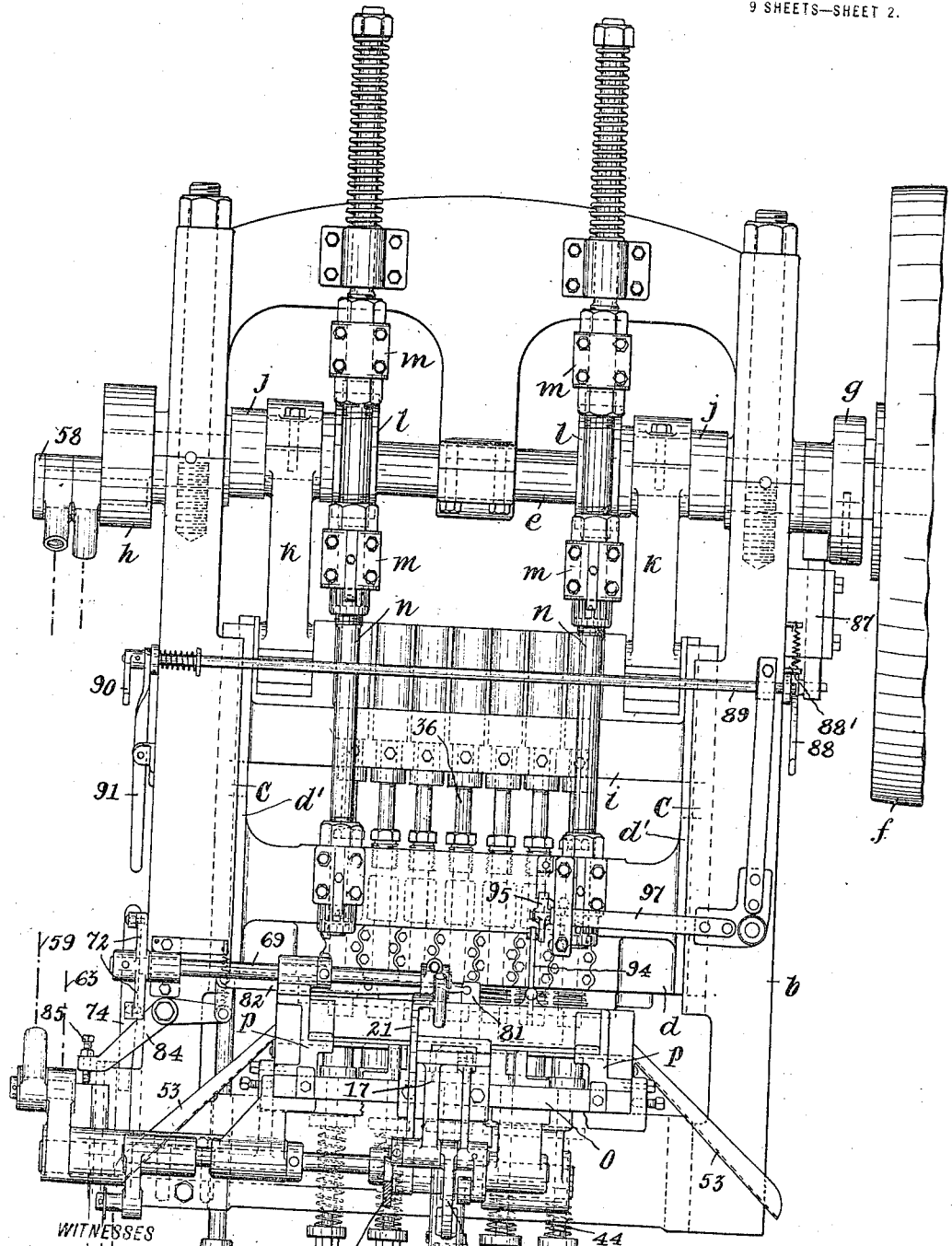

A. CALLESON.
MACHINE FOR MAKING ARTICLES OF SHEET METAL.
APPLICATION FILED JAN. 25, 1915.
1,289,387.
Patented Dec. 31, 1918.
9 SHEETS—SHEET 3.
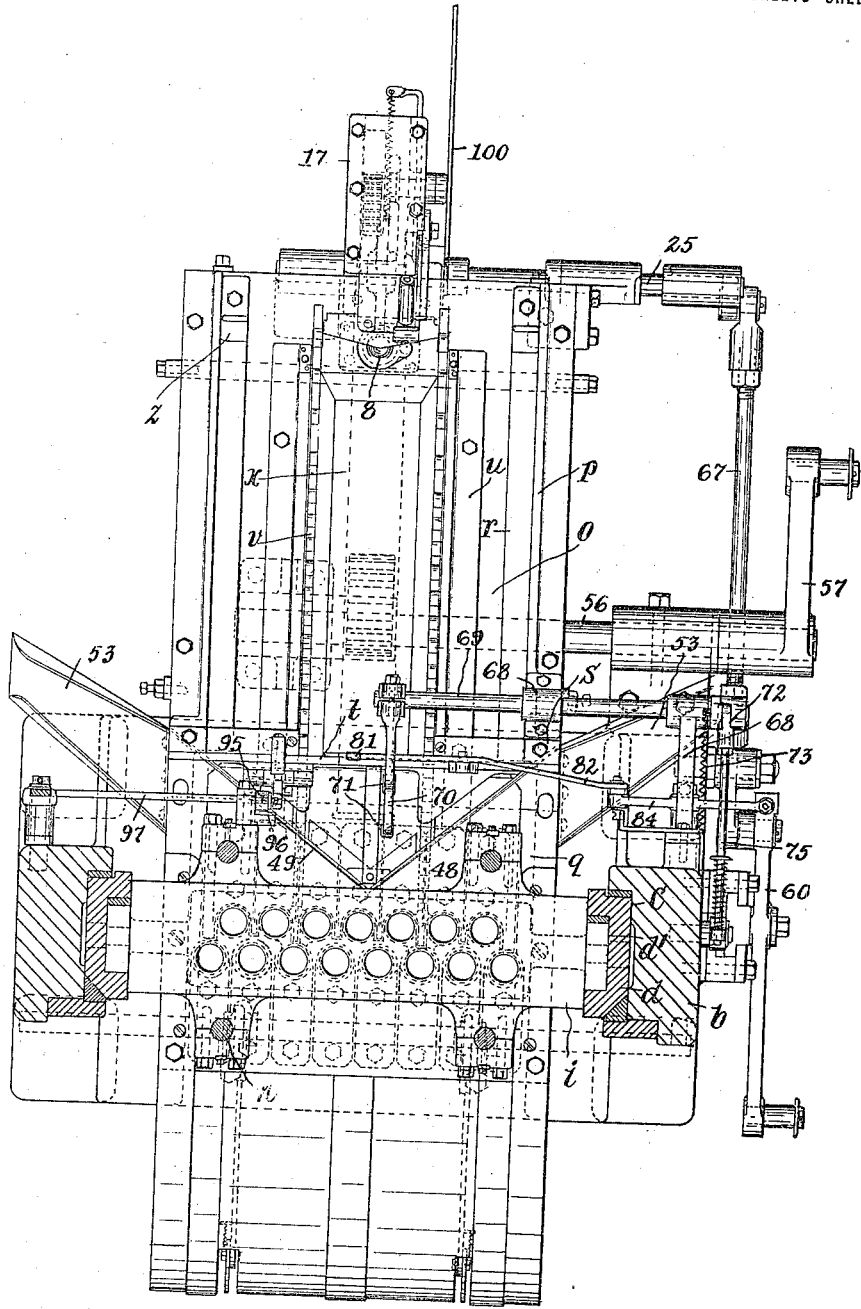
WITNESSES
INVENTOR
Amos Calleson,
BY
ATTORNEY.

A. CALLESON.
MACHINE FOR MAKING ARTICLES OF SHEET METAL.
APPLICATION FILED JAN. 25, 1915.
1,289,387.
Patented Dec. 31, 1918.
9 SHEETS—SHEET 4.
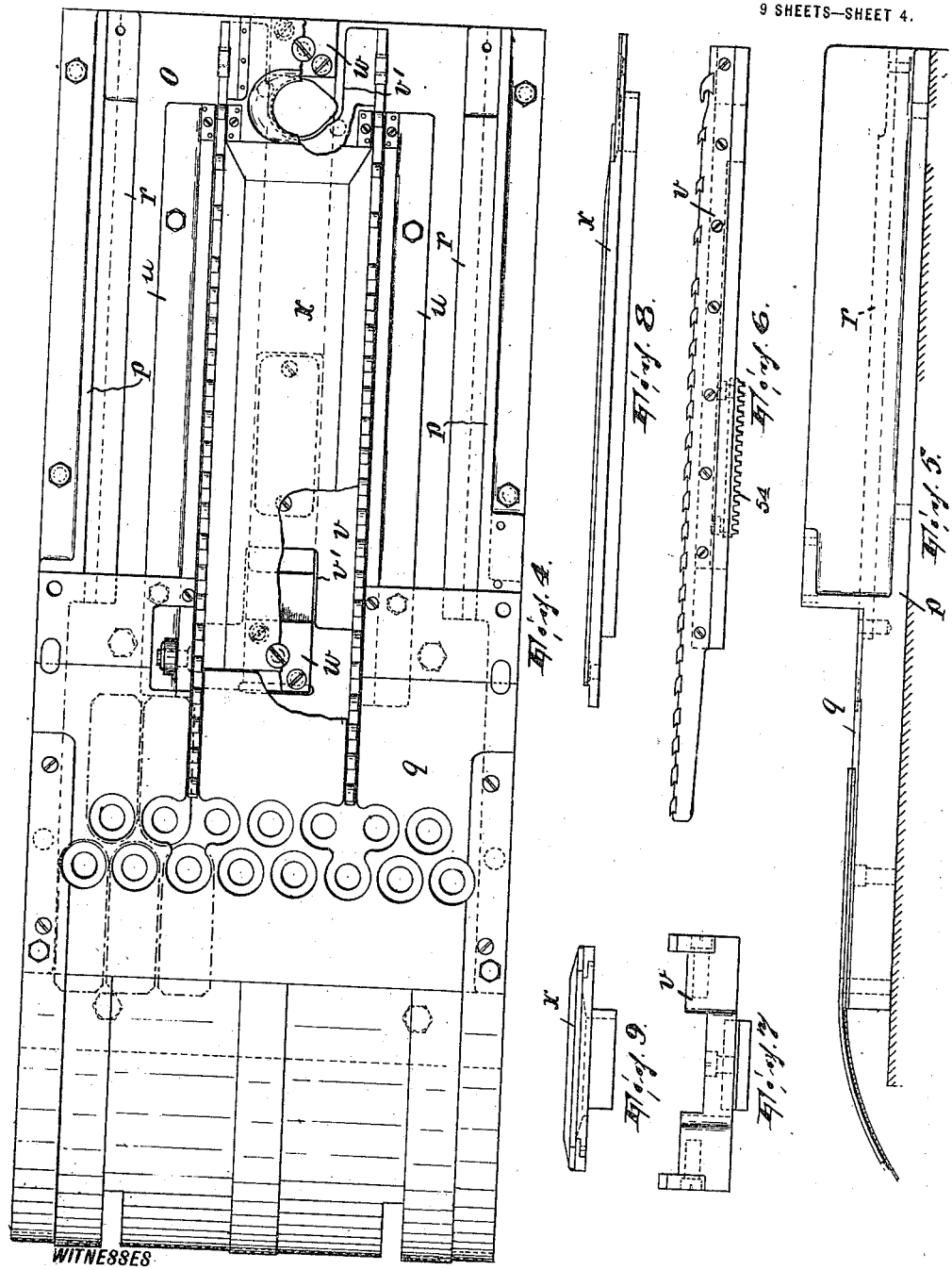
WITNESSES
INVENTOR,
Amos Calleson,
BY
ATTORNEY

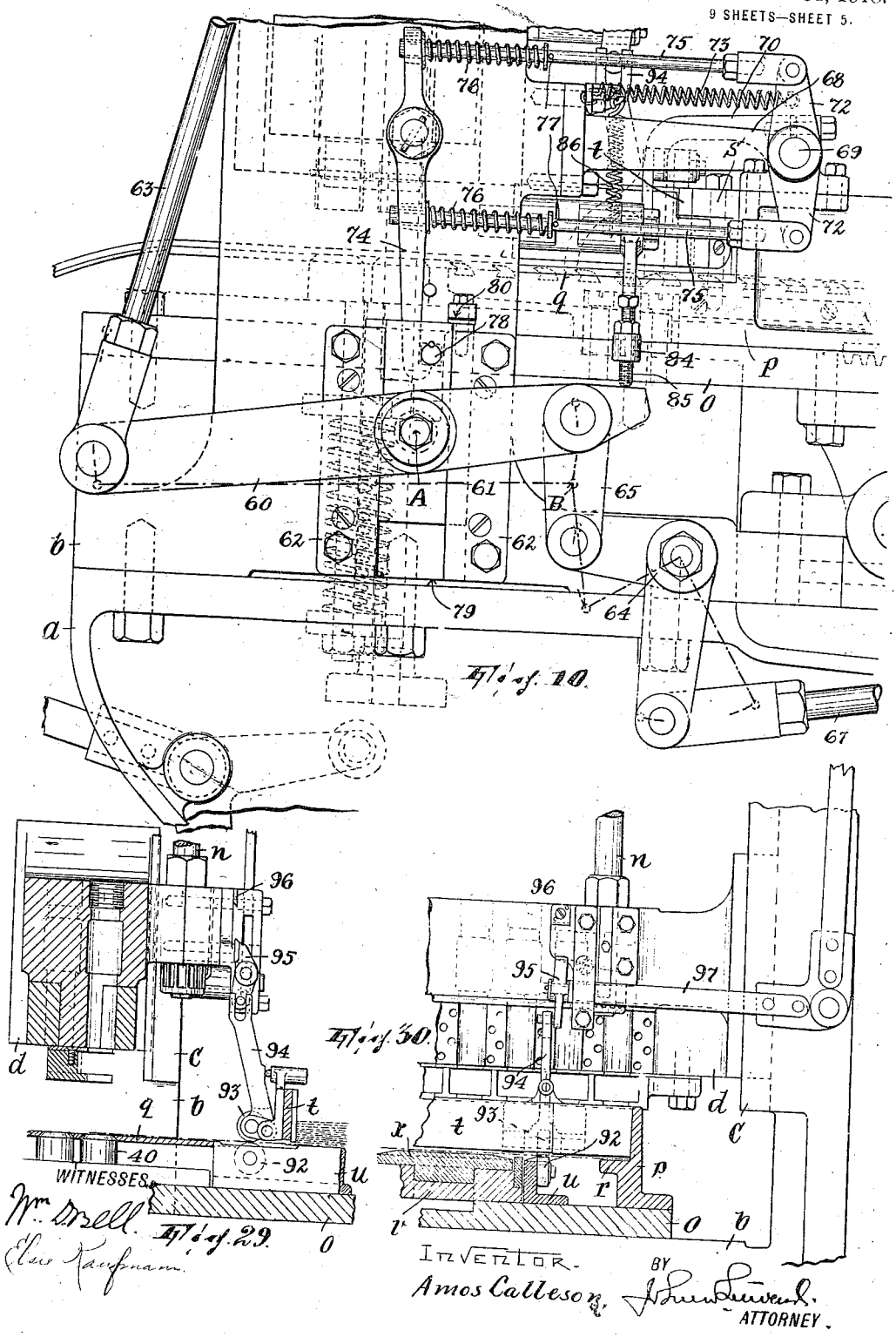

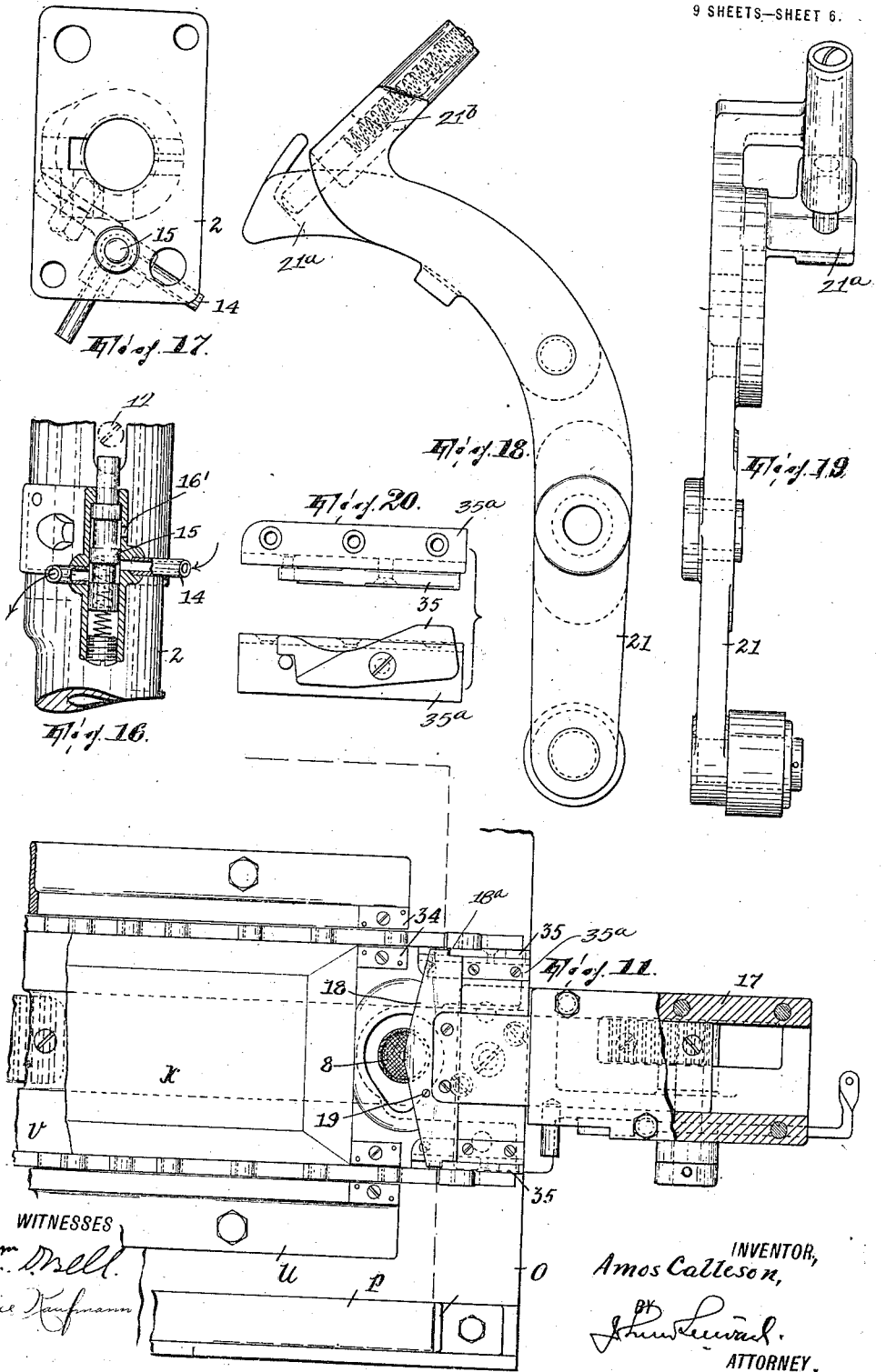

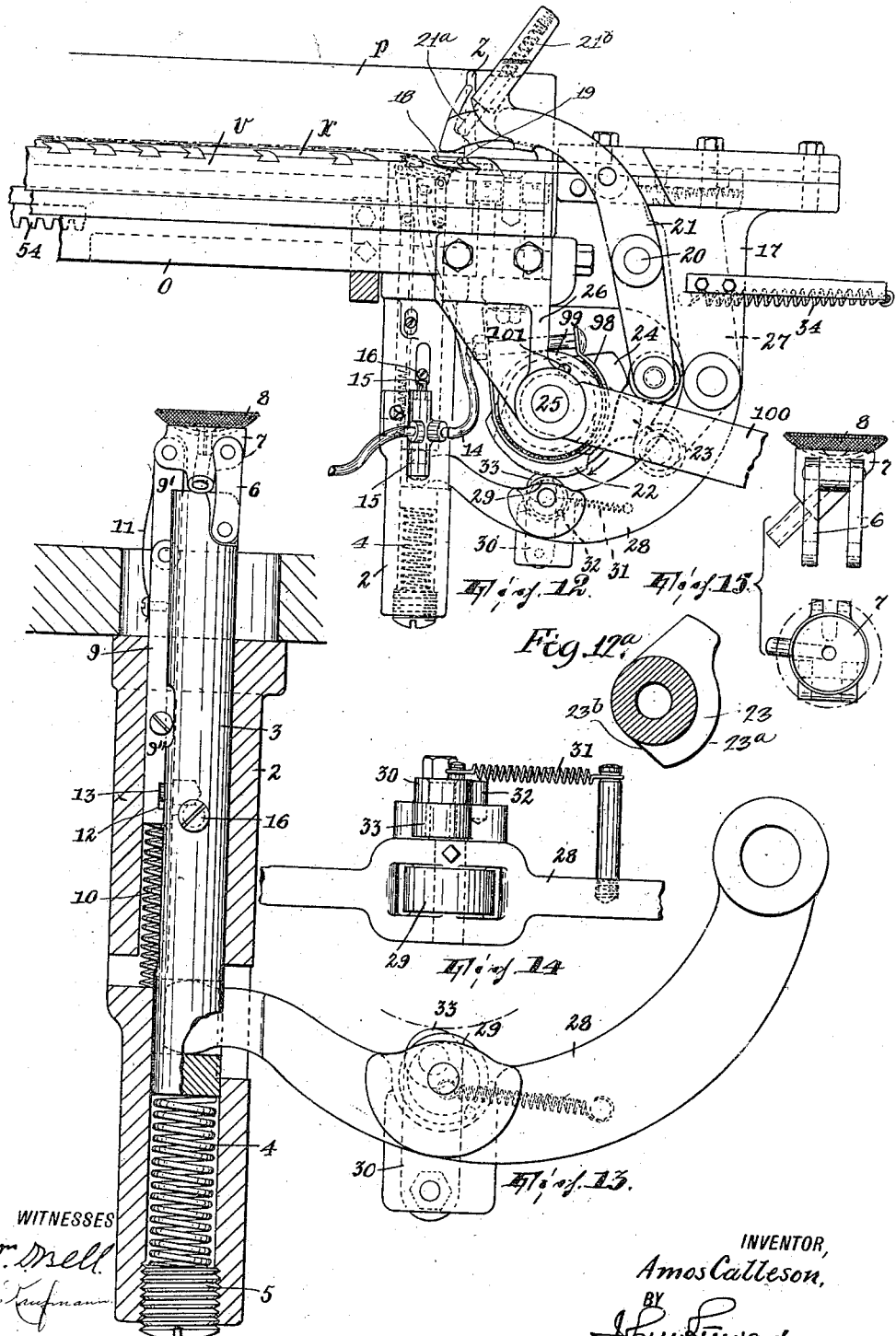

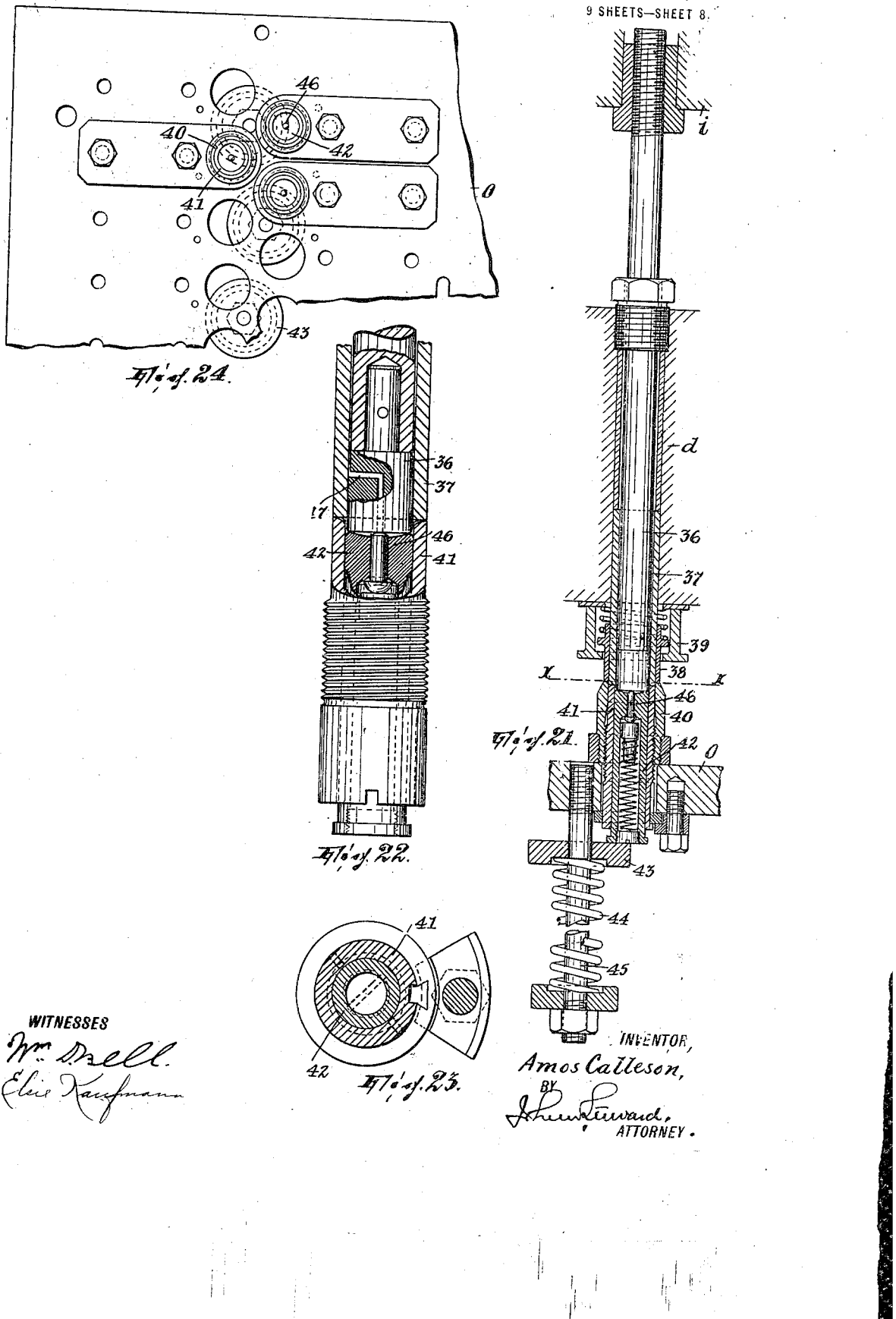

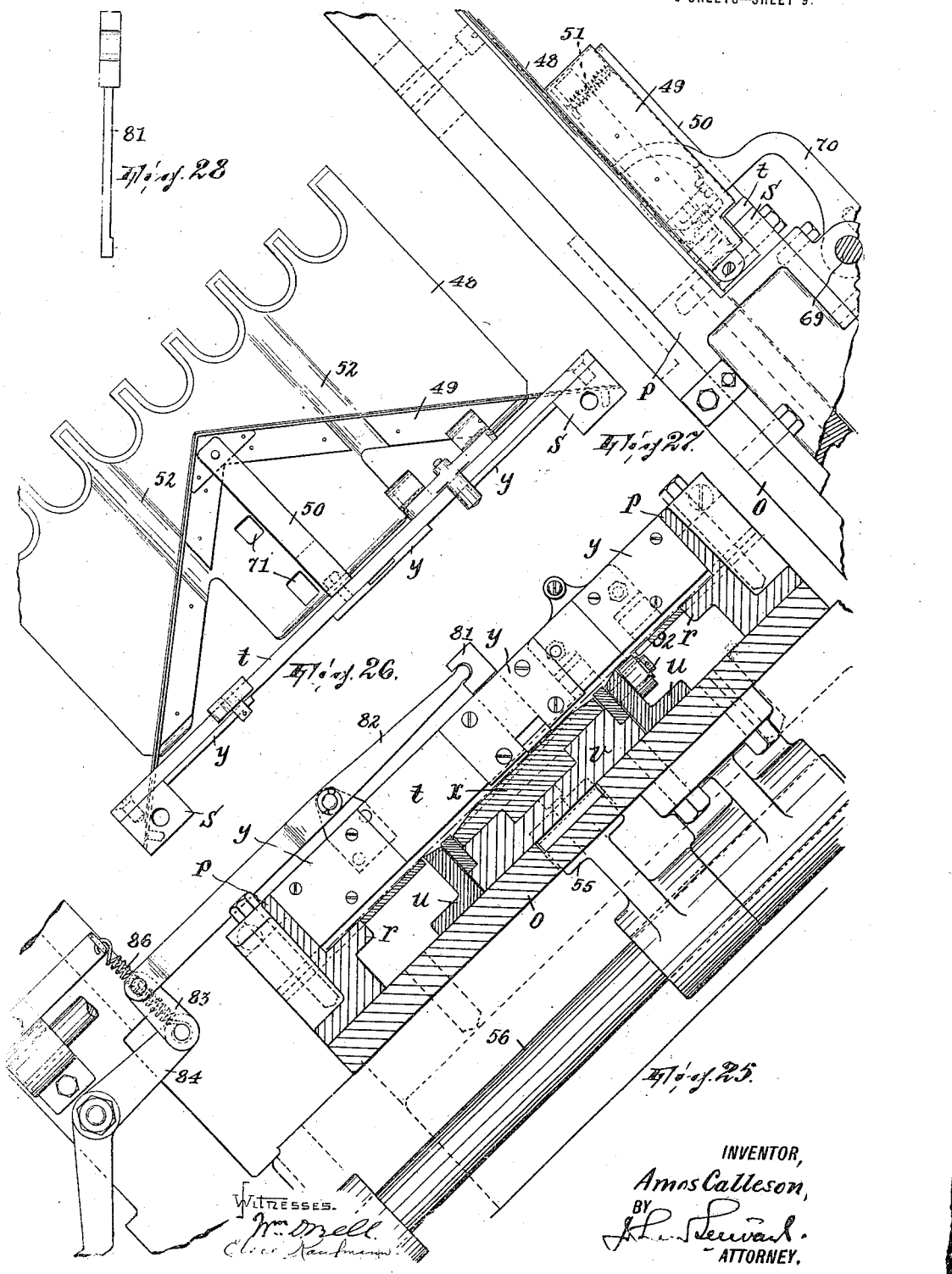

UNITED STATES PATENT OFFICE.

AMOS CALLESON, OF BROOKLYN, NEW YORK, ASSIGNOR TO ADRIANCE MACHINE. WORKS, INC., OF BROOKLYN, NEW YORK, A CORPORATION OF NEW YORK.

MACHINE FOR MAKING ARTICLES OF SHEET METAL.

1,289,387.   Specification of Letters Patent.   Patented Dec. 31, 1918.

Application filed January 25, 1915. Serial No. 4,330.

*To all whom it may concern:*

Be it known that I, AMOS CALLESON, a citizen of the United States, residing at Brooklyn, in the county of Kings and State of New York, have invented certain new and useful Improvements in Machines for Making Articles of Sheet Metal, of which the following is a specification.

This invention relates to machines for automatically advancing sheets from a stack, planiform fashion and one by one or in any other predetermined order, to a set of dies or other means for operating on the sheets, and it consists in certain improvements in such machines designed to increase their efficiency and reliability.

In the accompanying drawings, in which said improvements are fully illustrated,

Figure 1 is a side elevation of the improved machine;

Fig. 2 a front elevation, looking in the direction of the arrow in Fig. 1;

Fig. 3 is a plan of so much of the machine as is below the plungers carrying the moving die parts;

Fig. 4 is a plan and Fig. 5 a side elevation of the bed-including structure whereon the stack of sheets is placed and over which the sheets are advanced;

Figs. 6 and 7 are a side and an end elevation of the sheet-advancing rack-structure;

Figs. 8 and 9 are a side and an end elevation of a cover-plate overlying the rack-structure;

Fig. 10 is a side elevation, enlarged, of a detail of Fig. 1;

Fig. 11 is a plan and Fig. 12 a side elevation of the part of the machine directly including the sheet separating means, the near wall $p$ being removed in Fig. 12;

Figure 1:
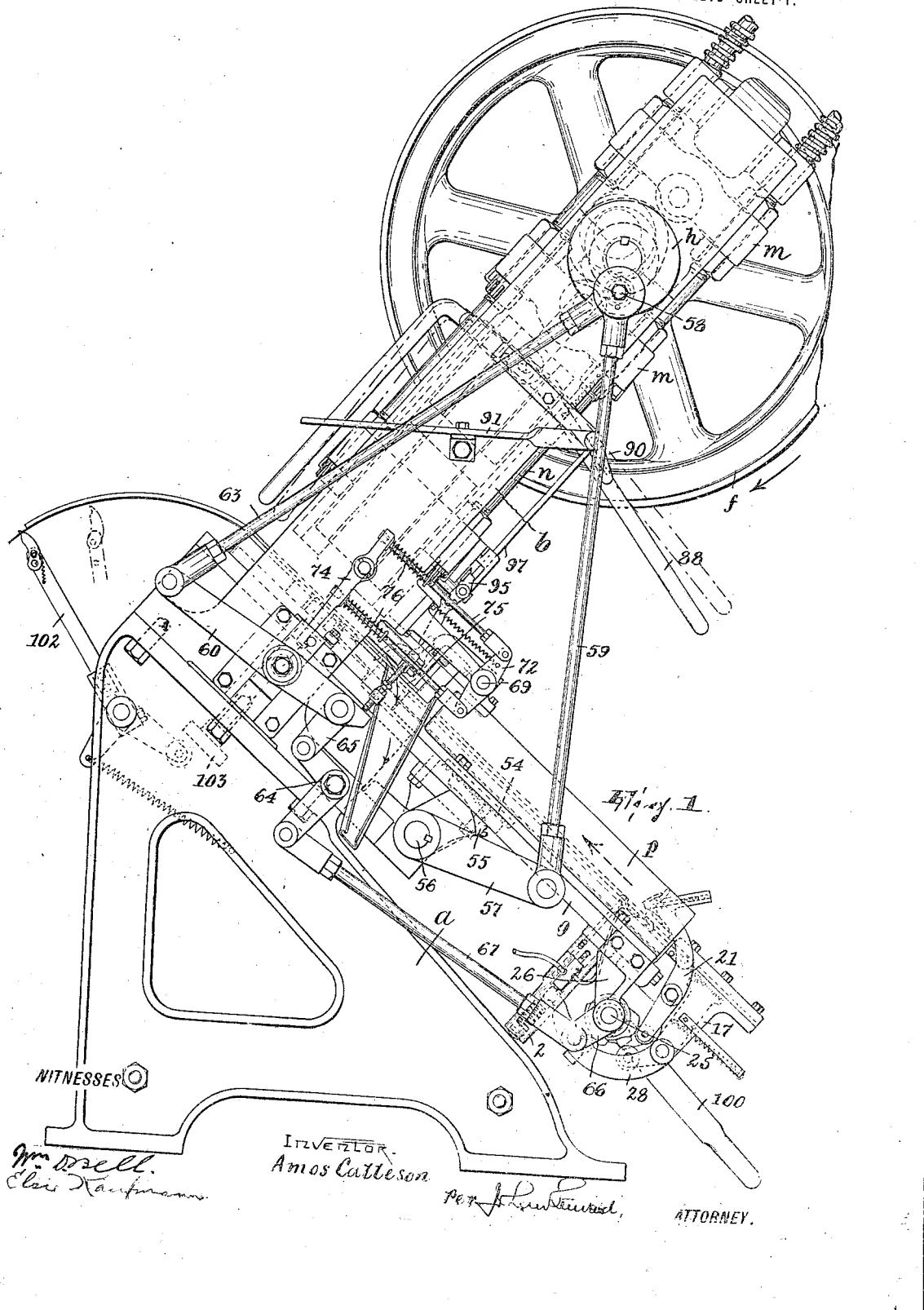

Fig. 12$^a$ shows a certain cam 23;

Fig. 13 shows the suction device and its actuating lever in side elevation, partly in section, and Fig. 14 is a plan of a fragment of said lever and a certain chock 30, while Fig. 15 is a side elevation and a plan of the suction cup 7 (the cup proper 8 thereof being omitted in the plan), and Figs. 16 and 17 are a fragmentary side elevation and a plan of the part 2 and its adjuncts;

Figs. 18 and 19 are side and front elevations, respectively, of the presser 21; and Fig. 20 shows in plan and side elevation one of the levers 35 shown in Fig. 11;

Fig. 21 is a vertical sectional view of one of the forming means, and Figs. 22 and 23 details thereof, the latter being a sectional view on line $x$—$x$ of Fig. 21;

Fig. 24 is a plan of the lower dies;

Fig. 25 is a transverse sectional view taken just behind the barrier for the stack of sheets;

Figs. 26 and 27 are a plan and a side view illustrating the "hold-down" and Fig. 28 a detail thereof; and, Figs. 29 and 30 are side and front views of the means for automatically stopping the machine.

The frame $a$ comprises in its superstructure $b$ guides $c$ for the vertically moving plunger $d$ and bearings for the drive shaft $e$ having on one end the (loose) drive wheel $f$ disconnectively connected with said shaft by any suitable form of clutch $g$ and on the other end the crank disk $h$. The guiding portions of the plunger $d$ include upward projections $d'$ forming guides for another plunger $i$. The latter plunger is operatively connected with cranks $j$ on the shaft $e$ by the links $k$, whereas the plunger $d$ is connected with the cams $l$ on said shaft through the medium of the cross-heads $m$ having suitably attached thereto the rods $n$ carrying said plunger.

On the base of superstructure $b$ is secured the table or bed $o$ which supports the lower dies, the sheet-separating mechanism and certain other parts concerned in the support of the stack of sheets and the planiform advancement thereof. This bed is equipped along each side with the upstanding walls $p$, the forward portions of which form the sides of a magazine for the sheet-stack and the rearward portions of which are depressed to an extent which brings a die-cover plate $q$, resting thereon, just flush with the inwardly projecting stack-supporting flanges $r$ of the rear portions of said walls, as seen in Fig. 5. To a pair of blocks $s$ secured in the angles between the forward and rear portions of the walls $p$ is suitably attached the fixed barrier $t$ (Figs. 10, 25, 26 and 27). suitably spaced from the top surface of the die-cover plate. On the bed, between and parallel with the walls $p$, are the angle-iron walls $u$ whose tops are flush with the top surfaces of the flanges $r$ of said walls and which serve for guiding rectilinearly the rack structure $v$ (consisting of a plate having a rack attached to each side thereof as shown in Figs. 4, 6 and 7) which may be recessed at each end, as at $v'$, Fig. 4, to accommodate the fixed blocks $w$ upon which is secured a plate $x$ which overlies the rack-structure and whose top surface is flush with that of the flanges $r$. The tops of the walls $u$ and the margins of the plate $x$ are beveled (Fig. 25) so that a shallow channel is formed up into which the teeth of the corresponding rack project (though depressed below the stack-supporting plane). $y$ denotes spacers secured to the magazine side of the barrier to assume the contact of the edges of the sheets and $z$ gages against which the tail edges of the sheets abut.

The tail end of the lowermost sheet in the stack, which on a view to Fig. 12 will be seen to project from the plate $x$ unsupported, is drawn down into engagement with the teeth of the rack-structure $v$, whereupon a positive separator enters between said sheet and the stack and, as the sheet is advanced by the rack structure, the stack is gripped and held so that only the lowest sheet can move forward. A suction means (Figs. 12 to 16) is employed for drawing down the tail end of the sheet, being constructed as follows: Bolted to and depending from the bed $o$ is a tubular guide 2 in which slides a stem 3 supported by a spring 4 seated on an adjusting screw 5 in the lower end of the guide. Above the stem and pivotally connected therewith by the links 6 is a suction cup 7 having an elastic cup proper 8. The links 6 are arranged at one side of the cup and stem (that is, on the side thereof opposite the direction of advance of the sheets) and on the opposite side the cup is supported so as to normally stand horizontally by the jointed slide 9 suitably guided in grooves in the stem and guide and stepped upon a spring 10 housed in the guide. The upper section $9'$ of the slide 9 is normally held against the side of the stem (i. e., upright), by the spring 11. 12 is a recess in the side of the lower member $9''$ of the slide and receiving a stud 13 on the stem; the arrangement is such that the stem may perform a certain amount of downward movement independently of the slide, upon which the slide partakes of such movement. In the use of this device, therefore, the effect on the sheet is initially to bend the extreme edge portion away from the stack, accomplished while the stem is moving independently of the slide, and then to effect a general depression of the tail of the sheet, accomplished while the slide is moving with the stem; incident to this latter or secondary effect there must be allowed a shifting of the suction cup relatively to its carrier (the stem) in the direction of advance of the sheet which is accomplished by the pivotal connections 6 and $9'$. 14 is a tubular connection leading from the cup 7 to a suitable valve 15 which normally establishes connection between the suction cup and a suitable exhausting means but which when actuated by a stud 16 on the descending stem first cuts off such connection and then admits atmospheric air to the cup at the port $16'$. The suction device projects through the bed $o$ directly back of plate $x$ midway between the racks of the rack-structure $v$. In a bracket 17 bolted to the bed back of the suction device reciprocates forwardly and rearwardly the positive separator 18 having a rack on its under side as shown in Figs. 11 and 12 and formed on its upper surface with a spur 19; its front edge is angular, the apex of its angle being alined with the center of the cup. In the bracket 17 on the stud 20 is fulcrumed the presser 21 having a pivoted foot $21^a$ cushioned by a spring $21^b$ (Figs. 18 and 19) adapted to bear down upon the stack. The suction device, positive separator and presser are actuated by cams 22, 23 and 24, fixed on a rock shaft 25 suitably journaled in brackets 26 depending from the bed, the presser by having one arm thereof bearing against cam 24, the positive separator through the medium of a lever 27 bearing against cam 23 and having segmental teeth engaging with the rack of the separator and the suction device as follows: 28 is a lever fulcrumed in the bracket 17, engaged with the stem 3 and having a roller 29 bearing against the cam 22. Pivoted to one side of this lever is a chocking member 30 which a spring 31 tends to pull against a stop 32, where it stands substantially upright. It carries a roller 33 adapted to bear against the concentric portion of the periphery of cam 23. This chocking member modifies the motion (that is, a gradual rise and fall) which the lever 28 would have under the influence of cam 22 if said member were not present, so that it descends gradually, stands at a dwell and then rises quickly, thus: in the acting stroke of the cams (arrow, Fig. 12) cam 22 through roller 29 gradually depresses lever 28; but meanwhile the chocking member 30 has been drawn to the upright position by its spring, and this position it maintains during the return stroke of the cams and, supported by the concentric surface $23^a$ of cam 23 and so keeping the lever depressed, until it runs off the end of said concentric surface indicated at $23^b$ in Fig. $12^a$, and said surface moves again in the direction of the arrow in Fig. 12, allowing the lever quickly to rise. The object is to delay the upward movement of the stem 3 until the sheet has been moved forward clear thereof by the rack structure, and thereupon compensate for the delay by a quick upward movement. It will be understood that the spring of the cushioned arm of the presser and the spring 4 maintain the presser and lever 28 against their cams. A spring 34 holds the lever 27 against its cam. The suction device first draws down the tail of the lowermost sheet, and then the positive separator is interposed between the sheet and the stack, and finally the presser presses the stack down against the positive separator, the lowermost sheet being securely held by the spur 19 engaging therein so as to prevent its being dragged forward with the sheet being advanced.

The rearmost tooth on each rack of the rack-structure (Fig. 6) is designed so that upon engaging the tail of the sheet and thereupon advancing the sheet said tooth will coact with the hardened blocks 34 to form downward bends in the sheet. In the ensuing reciprocations of the rack-structure these bends adapt the sheet to be engaged by the remaining teeth of the rack intermittently and be thereby advanced step by step. The remainder of the stack, while the lowermost sheet is being advanced, is held elevated out of the path of the rearmost teeth of the rack-structure by levers 35 (Figs. 11 and 20) whose forward ends underlie the stack and are depressed by the positive separator when the same moves forward and elevated when it moves rearward. These levers are pivoted to blocks 35$^a$ which are secured to bed $o$ one on each side of the separator and so that as lugs 18$^a$ on the separator work back and forth over the blocks each will engage first one and then the other end of the corresponding lever and thus rock it.

There is usually a single rocking (forward and back) of the cams with shaft 25 for each sheet cleared from the stack by the rack structure, the forward part of such movement causing descent of the suction device, introduction of the separator and pressure movement of the presser and the backward part causing coincident retraction of the presser while the suction device and separator remain at dwell and ultimate return of the suction device and separator to their original positions at the end of such backward part of the movement.

The present machine is designed for punching out and shaping bottle caps and similar product by means of suitable dies. Referring to Figs. 21 to 24 in particular, illustrating one die unit, 36 is a male die secured to and depending from the plunger $i$ through the plunger $d$ and 37 a male cutting or punching die secured in the plunger $d$ and penetrated by the die 36; 38 is a spring actuated stripper carried by the plunger $d$ and 39 its supporting thimble. 40 is a female cutting or punching die with which the die 37 coacts, the same being secured on the bed $o$ and having its top substantially flush with the die cover $q$; 41 is a female drawing die with which the male die 36 coacts, the same being contained in die 40 and suitably supported fixedly. 42 is an ejector penetrating die 41 and resting upon a disk 43 which in turn rests upon a spring 44 supported by a bolt 45 depending from the bed. The upper end of the ejector is concave to allow the top wall of the bottle cap to assume convex shape, and in order to prevent the caps being retained within the concavity of the ejector by absence of air between them the ejector is equipped with a spring pressed ejecting stem 46. Any possibility of the cap adhering to the male die 36 due to absence of air between them is prevented by providing the air admission duct 47 leading to the acting face of said die. The dies are arranged in a line of sets extending transversely of the bed, three die units to a set (Figs. 3, 4 and 24), being grouped together in a disposition as compact as possible to reduce the scrap to the minimum, and one cushioned disk 43 serves to support the ejectors of three die units.

It is very important that the sheet being advanced be kept perfectly flat, i. e., in substantially uniform contact with the surface over which it moves, forward of the barrier, so that the dies may operate to the best advantage and so that the sheet, by buckling, will not set in operation the means (to be described) which controls the means (already described) for bringing the sheets into the advancing influence of the rack-structure; it is also important that the articles formed, which are ejected on to the sheet and fall downward (the machine being inclined, Fig. 1) be so disposed of as not to possibly catch on the sheet following. To this end I provide a hold-down 48 which extends from the barrier $t$ forward to the dies, its rearward end being slightly upturned and its forward end recessed and beveled around the dies as shown in Fig. 26. This hold-down is attached to a support 49 which is angular in plan, the apex being toward the dies, and which is formed of angle iron, being secured to the blocks $s$ (Figs. 26 and 27). A rigid arm 50 projects forward from the barrier $t$ and between its free end and the apex portion of the support 49 is interposed a spring 51, so that the hold-down is maintained against tilting upward at the front. In alinement with the racks of the rack-structure the hold-down is elevated as shown in Fig. 26, at 52, so as to accommodate the bends initially formed by the racks at the tail of the sheet and which, whereas they extend downwardly at first, so long as they are accommodated in the channel between plate $x$ and wall $u$, latterly, ride upon the unchanneled surface of the die cover and so produce localized elevations in the tail of the sheet. The articles formed, as they fall from the dies, are deflected to both sides by the support 49 acting as a deflector, and thereupon enter chutes 53 from which they are discharged into suitable receptacles.

The rack-structure has an underneath rack 54 with which meshes a toothed segment 55 carried by a rock shaft 56 which has a crank 57 connected with a wrist pin 58 on the crank disk $h$ by the pitman 59.

The actuation of the means for successively selecting the sheets which are to be advanced by the rack structure is accomplished by a novel mechanism including a moving master member, in the present instance actuated from the drive shaft, and a releasable purchase-affording connection between the master member and the frame. Referring to Figs. 1 and 10, 60 is a lever which is fulcrumed between its ends in a block 61 movable vertically in suitable guides 62 at one side of the superstructure $b$. One arm of this lever is connected with the wrist pin 58 by the pitman 63. The other arm is connected with one arm of a bell crank lever 64, fulcrumed in the bracket in which the rock shaft 56 is journaled, by the link 65. The other arm of the bell crank lever and a crank 66 on the shaft 25 which carries the cams for controlling the selecting means are connected by the pitman 67. It will be apparent that in the rotation of the drive shaft the described connections between the crank pin 58 and the rock shaft 25 will be ineffectual to actuate the latter in the absence of means establishing a purchase-affording connection between the master member and the frame, lever 60 simply oscillating idly on the link 65, but that if such means be provided said lever will move about its fulcrum in the block 61 and through the connections 64, 67 and 66 will rock the rock shaft 25. The interposing of such purchase-affording means for the master member is accomplished from the sheets in the following way: In brackets 68 (Figs. 3 and 10) is journaled a rock shaft 69 carrying a feeler 70 whose two fingers project through holes 71 in the hold-down. The rock-shaft 69 also carries a double crank 72 the upper one of which is connected with a fixed part of the frame by the spring 73, so that the fingers of the feeler are normally pressed downwardly. 74 is a pawl pivoted between its ends on the superstructure and having rods 75, pivotally connected to arms of the crank 72, passed loosely through the pawl both sides of its pivot. Springs 76 coiled about the rods between pins 77 therein and the pawl preserve the crank, pawl and rods normally in substantially parallel-lever arrangement. When there is no sheet beneath the feeler spring 73 acts to maintain the hooked or lower end of the pawl in position to catch a stud 78 projecting inwardly from the block 61. The limits of vertical movement of the block 61 are indicated at 79 and 80 in Fig. 10. In view of this description it will be apparent that when no sheet underlies the feeler the master member will be caught and held by the pawl at the upper end of its path of movement in the guides 62 so that on each rotation of the drive shaft the rock shaft 25 will be rocked, and that when a sheet underlies the feeler, since then the master member is no longer restrained by the pawl, the actuating influence of the drive shaft is expended in simply oscillating the master member idly. In the first case the lever 60 will oscillate around the axis marked A in Fig. 10; in the second case said lever will oscillate around the axis marked B in said figure, the parts 60, 65, 64 and 67 being then in the positions indicated by skeleton dot-and-dash lines in said figure. Of course, in the regular operation of the machine the parts 60, 65, 64 and 67 will occupy most of the time the depressed (idle) position just alluded to, only shifting to the (active) position shown in full lines in Figs. 1 and 10 in the comparatively short periods when there is no sheet beneath the feeler.

The barrier $t$ affords a guide for a vertically sliding gate 81 to which one end of a lever 82 is connected, said lever being fulcrumed in the barrier and having its other end connected with a link 83 in turn connected with the lever 84 fulcrumed in the superstructure and equipped with a set-screw 85 which overlies and is adapted to be impinged by the lever 60. A spring 86 normally holds the lever train including the gate in the position where the gate is held down against the die-cover. Now each time part 60 is caught and held in the active position (followed by the selecting and starting forward of a fresh sheet from the stack) the right hand end of lever 60, now oscillating around axis A, by engaging set screw 85, elevates the gate just enough to allow said sheet to pass, and on the ensuing return of said parts to the depressed position (where lever 60 is out of reach of set screw 85) spring 86 will hold the gate down against said sheet so that the next sheet is prevented from working forward.

The clutch $q$ is made to establish driving connection between the drive wheel $f$ and the shaft $e$ through any suitable mechanism as 87 from the spring-pulled controlling lever 88 which is held in the position to maintain said clutch active by the spring-pressed sliding latch rod 89 which is moved to the left in Fig. 2 to release the lever 88, so as to stop the machine, either by the handle 90 or the lever 91, the lever then coming against the stop-pin 88'.

The actuation of the latch-rod to stop the machine is automatically effected, in case more than one sheet succeeds in passing the barrier, by the following means: Referring to Figs. 29 and 30, the top of one of the angle irons $u$ just beyond the barrier $t$ is recessed and carries a roller 92, the top of which is flush with the sheet supporting surface. A roller 93 carried by a bell-crank lever 94, fulcrumed in the barrier $t$, is adapted to bear down on the roller 92, said lever having a long upwardly extending arm having a slot and pin connection with a pivoted dog 95. The toe of the dog is adapted to be moved by the lever 94 into the path of a dagger 96 on the descending plunger $d$. If only one sheet passes the barrier and interposes itself between the rollers the incidental movement of the dog will still leave it clear of the dagger; but if two or more sheets should pass the barrier the movement which the dog assumes is sufficient to bring it into the path of the dagger. The dog is carried by a lever 97 fulcrumed in the superstructure and suitably connected with the latch rod, so that when it is depressed the latch rod is moved to the left to release the lever 88 and so stop the machine.

To hold shaft 25 at each limit to which it is oscillated I provide the brake band 98 suitably attached to some fixed part of the machine and embracing a brake drum 99 on said shaft. When the machine stops automatically, the stack will usually be held gripped between the presser and the positive separator, and in order to release the stack so that the prematurely advanced second sheet may be restored with the rest of the stack I provide for turning shaft 25 against the resistance of the brake band to its normal position, this being accomplished by a lever 100 which is fulcrumed on the shaft 25 and may by hand be raised against a pin 101 on the brake drum to turn the shaft.

A pivoted arm 102, spring-held in the position shown in Fig. 1, is thrown back each time the plunger $d$ descends by the foot 103 engaging an extension of the arm, and on the return movement is adapted (as soon as the sheet comes within range) to eject the punched sheet from the machine.

Operation: The magazine being occupied by a stack of sheets and the machine being started by moving the lever 88 so as to draw down on the mechanism 87 and the latter being locked in the set position by the latch-rod 89, on each rotation of the drive shaft the rack structure is reciprocated and lever 60 oscillated. There being no sheet present under the feeler 70 the master member including lever 60 is in its elevated position, so that the fulcrum of said lever is at point A, in consequence of which the train of parts connecting said lever with the shaft 25 will transmit an oscillatory movement to said shaft, resulting in the separating of the lowest sheet from and the gripping of the rest of the stack; in the same cycle of the drive shaft the rack structure is caused to advance the said sheet one stage, the sheet being advanced sufficiently at least to actuate the feeler. This latter occurs in the more or less depressed position of the right hand end of lever 60 and from that time until the sheet passes from beneath the feeler lever 60 continues to oscillate idly around point B, transmitting no motion to shaft 25. The gate 81, which received its opening movement from the lever 60 when the latter was oscillating around point A, thus allowing the lowest sheet to pass forward under the barrier, now remains held down against the sheet by spring 86, uninfluenced by the (depressed) lever 60. The rack-structure continues to advance the sheet step by step to and under the dies, the sheet from the barrier forward to and around the dies being kept perfectly flat by the hold-down, and as fast as the caps or other product are formed they fall down against the deflector 49 and into the chutes 53, as described. When the sheet has cleared the dies the oscillating arm 102 catches the sheet and ejects it from the machine. The now-ensuing absence of a sheet beneath the feeler 71 calls into operation again the selecting means, so that another sheet is started on its course through the machine as above explained; that is to say, the hooked end of the pawl 74 being now moved to the right in Fig. 10, on the ensuing rise of the block 61 with lever 60 said block will be caught and held by the pawl so that lever 60 will operate the selecting means.

Having thus fully described my invention, what I claim as new and desire to secure by Letters Patent is:—

1. In combination, with the frame and means for operating on the sheets, means for actuating the first means including a moving master member, and a releasable sheet-controlled purchase-affording connection between the master member and the frame.

2. In combination, with the frame and means for operating on the sheets, means for actuating the first means including a moving master member, a shiftable support for said member, and sheet-controlled means for at times locking the support at a definite point in the frame.

3. In combination, with the frame and means for operating on the sheets, means for actuating the first means including a moving lever, and a releasable sheet-controlled purchase-affording connection between the lever and the frame.

4. In combination, with the frame and means for operating on the sheets, means for actuating the first means including a moving lever, a shiftable support for said lever, and sheet-controlled means for at times locking the support at a definite point in the frame.

5. In combination, with the frame and means for operating on the sheets including a sheet-advancing mechanism, means for actuating the first means including a moving master member, a releasable purchase-affording connection between the master member and the frame, and means, including a feeler actuated by the advancing sheets, for controlling said connection.

6. In combination, with the frame and means for operating on the sheets including a sheet-advancing mechanism, means for actuating the first means including a moving master member, a shiftable support for said member, means for at times locking the support at a definite point in the frame, and means, including a feeler actuated by the advancing sheets, for controlling the last-named means.

7. In combination, continuously moving means for advancing the sheets successively, means for holding a supply of the sheets, means for successively introducing the sheets into the control of the first means, an actuating means, a power transmitting train connecting the actuating means and the third-named means and including a moving master member, and a releasable purchase-affording connection between said member and the frame.

8. In combination, continuously moving means for advancing the sheets successively, means for holding a supply of the sheets, means for successively introducing the sheets into the control of the first means, an actuating means, a power transmitting train connecting the actuating means and the third-named means and including a moving master member and a sheet-controlled releasable purchase-affording connection between said member and the frame.

9. In combination, continuously moving means for advancing the sheets successively means for holding a supply of the sheets, means for successively introducing the sheets into the control of the first means, an actuating means, a power transmitting train connecting the actuating means and the third-named means and including a moving master member, a shiftable support for said member, and means for at times locking the support at a definite point in the frame.

10. In combination, continuously moving means for advancing the sheets successively, means for holding a supply of the sheets, means for successively introducing the sheets into the control of the first means, an actuating means, a power transmitting train connecting the actuating means and the third-named means and including a moving master member, a shiftable support for said member, and sheet controlled means for at times locking the support at a definite point in the frame.

11. Means for effecting separation of an end sheet in a stack of sheets from the next sheet including a support for the stack and a sheet-adhering sheet separating device movable one relatively to the other, said device including a pivotally supported sheet-adhering portion free to shift with the end sheet in the stack substantially parallel with the plane of said end sheet.

12. Means for effecting separation of an end sheet in a stack of sheets from the next sheet including a support having means to sustain the stack, a carrier movable in the support toward and from the stack, a sheet-adhering member pivoted in said carrier on an axis substantially parallel with the plane of said end sheet, and means, yieldingly arranged in said support and having lost motion engagement with the carrier, for connecting the carrier with said device at a point removed from said axis.

13. Means for effecting separation of an end sheet in a stack of sheets from the next sheet including a support having means to sustain the stack, a carrier movable in the support toward and from the stack, a sheet-adhering member pivoted in said carrier on a laterally shiftable axis substantially parallel with the plane of said end sheet, and means, yieldingly arranged in said support and having lost motion engagement with the carrier, for connecting the carrier with said device at a point removed from said axis.

14. In combination, with a support for the stack, movable means for operating on the stack, and means to move the first means to a definite position and there maintain it at a dwell including a rocking structure having a cam surface and a concentric surface formed around its axis, the cam surface being engaged by said means, and a chock normally held in interposed chocking relation to said means and the concentric surface and adapted to be moved out of chocking relation thereto by said structure on movement of the latter in one direction.

15. In combination, with a support for the stack, movable means for operating on the stack, and means to move the first means to a definite position and there maintain it at a dwell including a rocking structure having a cam surface and a concentric surface formed around its rocking axis, the cam surface being engaged by said means, and a chock pivoted in said means and held bearing against the concentric surface.

16. In combination, with a support for the stack of sheets, a device operative upon the stack movable back and forth relatively thereto, means to move said device back and forth including a back-and-forth moving member adapted to move said device in one direction when said member moves in one direction and having means to hold said device at dwell when said member moves in the opposite direction, and another means operative upon the sheet during the dwell.

17. In combination, with a suitable support, punching means arranged therein, means to advance the sheet planiform fashion in the support to the punching means, and a product deflector at the approach side of the punching means extending across and above and spaced from the sheet plane.

18. In combination, with a suitable support, punching means arranged therein, means to advance the sheet planiform fashion in the support to the punching means, said support having a downwardly inclined sheet supporting surface at the approach side of the punching means and said punching means being adapted to discharge its product upon the sheet being operated upon and a product deflector extending obliquely across and above and spaced from said surface.

19. In combination, with a suitable support, punching means arranged therein, means to advance the sheet planiform fashion in the support to the punching means, and a sheet hold-down and product deflector at the approach side of the punching means extending across and above and spaced from the sheet plane.

20. In combination, with a suitable support, punching means arranged therein, means to advance the sheet planiform fashion in the support to the punching means, said support having a downwardly inclined sheet supporting surface at the approach side of the punching means and said punching means being adapted to discharge its product upon the sheet being operated upon and a sheet hold-down and product deflector arranged above and close to said surface.

21. In combination, with a suitable support for a stack of sheets, means for removing the sheets from the stack planiform fashion and in the order of their succession counting from the support, a gate movable to and from the support, normally held against the latter and arranged in the path of removal of the sheets, and means, including a sheet actuated feeler, for periodically moving the gate away from the support.

22. In combination, the frame, forming means arranged therein and including a moving forming member, driving means for said member and means to control the driving means including a dagger on said member, and a sheet actuated dog movable into and out of the path of movement of said dagger.

In testimony whereof I affix my signature in presence of two witnesses.

AMOS CALLESON.

Witnesses:
JAMES T. BERNEY,
HENRY J. FLOOD.